United States Patent
Summers et al.

(10) Patent No.: US 9,411,104 B2
(45) Date of Patent: Aug. 9, 2016

(54) BROADBAND WAVEGUIDE BASED OPTICAL COUPLER

(71) Applicant: Infinera Corp., Annapolis Junction, MD (US)

(72) Inventors: Joseph Summers, Santa Clara, CA (US); Peter Evans, Mountain House, CA (US); Pavel Studenkov, Cupertino, CA (US); Mark Missey, San Jose, CA (US); Mehrdad Ziari, Pleasanton, CA (US)

(73) Assignee: Infinera Corporation, Sunnyvale, CA (US)

( * ) Notice: Subject to any disclaimer, the term of this patent is extended or adjusted under 35 U.S.C. 154(b) by 49 days.

(21) Appl. No.: 14/577,502

(22) Filed: Dec. 19, 2014

(65) Prior Publication Data

US 2016/0178846 A1   Jun. 23, 2016

(51) Int. Cl.
*G02B 6/12* (2006.01)
*G02B 6/28* (2006.01)
*G02B 6/26* (2006.01)
*G02B 6/293* (2006.01)
*G02B 6/14* (2006.01)

(52) U.S. Cl.
CPC ........ *G02B 6/29344* (2013.01); *G02B 6/12007* (2013.01); *G02B 6/28* (2013.01); *G02B 6/2804* (2013.01); *G02B 6/2813* (2013.01); *G02B 6/2938* (2013.01); *G02B 6/29379* (2013.01); *G02B 6/12004* (2013.01); *G02B 6/14* (2013.01)

(58) Field of Classification Search
CPC .. G02B 6/12004; G02B 6/12007; G02B 6/14; G02B 6/28; G02B 6/2804; G02B 6/2808; G02B 6/2813; G02B 6/293; G02B 6/29344; G02B 6/29379; G02B 6/2938
USPC ................. 385/11, 14, 15, 24, 27, 28, 39, 40, 385/45–47
See application file for complete search history.

(56) References Cited

U.S. PATENT DOCUMENTS

| | | | |
|---|---|---|---|
| 6,571,038 B1 * | 5/2003 | Joyner | G02B 6/2813 385/27 |
| 2009/0162007 A1 * | 6/2009 | Hamada | G02B 6/12007 385/14 |

* cited by examiner

*Primary Examiner* — Akm Enayet Ullah
*Assistant Examiner* — Michael Mooney
(74) *Attorney, Agent, or Firm* — Dunlap Codding PC; David L. Soltz

(57) ABSTRACT

An apparatus having a first waveguide, a second waveguide, a third waveguide, a fourth waveguide, and a fifth waveguide is described. A symmetric coupler has a proximal end and a distal end. The proximal end of the symmetric coupler is coupled to and in optical communication with the first waveguide and the second waveguide. The distal end of the symmetric coupler is coupled to and in optical communication with the fourth waveguide. An asymmetric coupler has a proximal end and a distal end. The asymmetric coupler is in a cascaded configuration with the symmetric coupler. The cascaded configuration has the proximal end of the asymmetric coupler coupled to and in optical communication with the fourth waveguide and the third waveguide. The distal end of the asymmetric coupler is coupled to and in optical communication with the fifth waveguide.

20 Claims, 12 Drawing Sheets

BROADBAND WAVEGUIDE BASED OPTICAL COUPLER

BACKGROUND

Multimode interference (MMI) couplers are known optical couplers that include one or more input waveguides (a waveguide typically comprises a waveguide core surrounded by a cladding material that has a lower refractive index than the core material) that are coupled to a wider waveguide section (also called a multimode or MM section), which is in turn coupled to one or more output waveguides. An MMI coupler allows one or more input signals having different wavelengths to be split or demultiplexed, combined and/or modified into one or more output waveguides through the self-imaging effect.

Symmetric 1×2 or 2×2 MMI couplers may have one or two inputs and two outputs, and the optical signals supplied from each output are typically designed to have the same or substantially the same power. Accordingly, symmetric 1×2 and 2×2 MMI couplers may be designed to have a 50:50 power splitting ratio. A multiplexer including cascaded symmetric MMI couplers may be provided to combine optical signals. Such multiplexers may be limited to multiplex $2^n$ input optical signals (n being integer), each of which being carried by a corresponding waveguide to the multiplexer. The coupling loss (i.e., fraction of power lost) per optical signal associated with symmetric MMI based optical multiplexers may have a theoretical minimum equal to $(1-1/n)$ when combining a number of optical signals equal to a power of 2 (e.g., at 4, 8, 12 4, 8, 16, etc.). Symmetric MMI couplers have broadband performance, i.e., such MMI couplers may be employed to multiplex or demultiplex optical signals over a wide range of wavelengths and are relatively compact in size as compared to combiners based on arrayed waveguide gratings (AWG).

Accordingly, MMI couplers and splitters are generally used for $2^n$ waveguide configurations, and, as such, the number of waveguide inputs into the multiplexer or the number of outputs from the demultiplexers is equal to $2^n$ where n is an integer. That is, the number of input waveguides may be 2, 4, 8, 16 . . . . Some optical circuits that are integrated on a substrate, e.g. photonic integrated circuits or PICs, however, multiplex or demultiplex a number of optical signals, other than a power of ($2^n$). For example, in certain configurations, a multiplexer may be required to combine ten optical signals, each of which being supplied to the multiplexer by a corresponding one of ten input waveguides. Conventionally, arrayed waveguide gratings have been employed in order to multiplex or demultiplex a non-power of 2 number of input optical signals. AWGs have minimal insertion loss, but are configured to combine or split only certain wavelengths, and thus have strict spectral limitations. Accordingly, broadband multiplexers or demultiplexers that combine or decombine a non-power of 2 number of optical signals with minimal insertion loss is desired.

SUMMARY

A method and system are disclosed. The problem of providing broadband capabilities in combining waveguides outside of $2^n$ configurations is addressed through methods and systems utilizing a MMI coupler configuration having both a MMI symmetric coupler and a MMI asymmetric coupler.

BRIEF DESCRIPTION OF THE SEVERAL VIEWS OF THE DRAWINGS

To assist those of ordinary skill in the relevant art in making and using the subject matter hereof, reference is made to the appended drawings, which are not intended to be drawn to scale, and in which like reference numerals are intended to refer to similar elements for consistency. For purposes of clarity, not every component may be labeled in every drawing.

DETAILED DESCRIPTION

Figure 1:
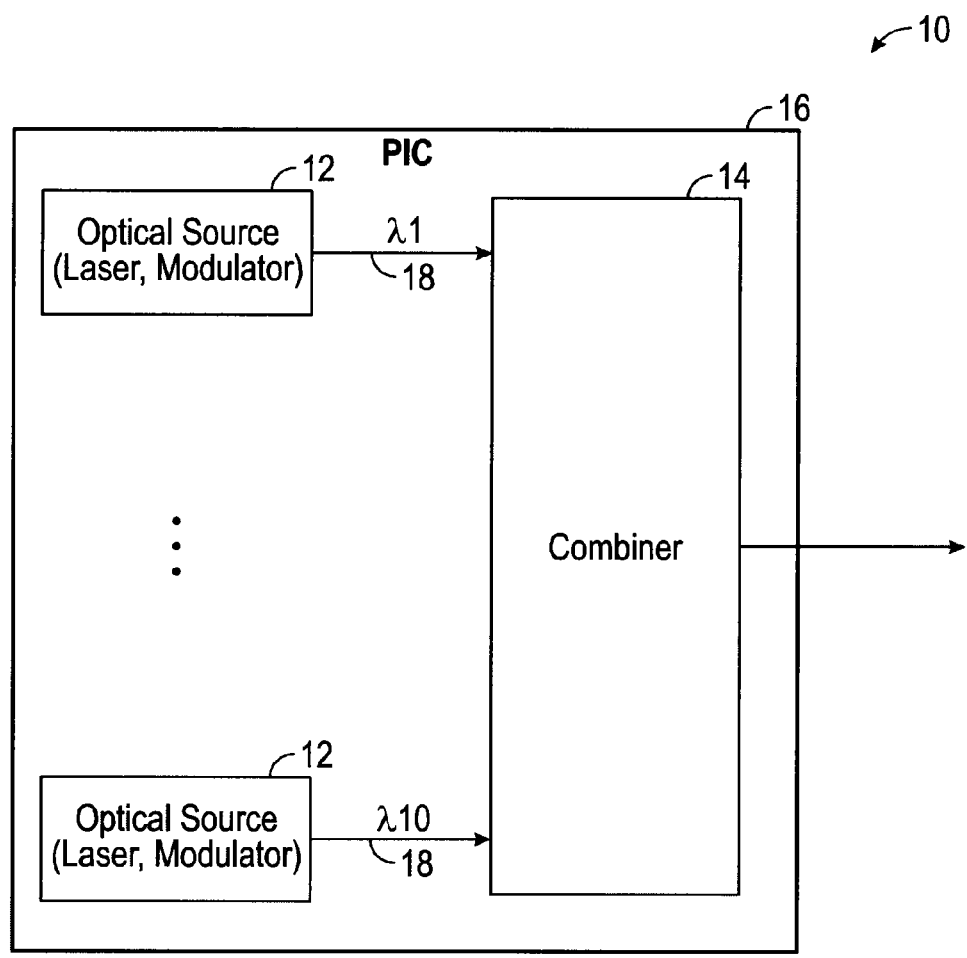
FIG. 1 is a diagrammatic view of an exemplary optical combining system having a combiner in accordance with the present disclosure.

Currently, within the art, MMI couplers use symmetric couplers to combine $2^n$ waveguides (e.g., 4, 8, 12 channels). In applications having configurations outside of $2^n$ waveguides, generally AWG or Mach Zehnders are used to couple or split power between waveguides. Size on a PIC, however, is limited and valuable. MMI couplers are relatively compact in size compared to combiners based on AWG and Mach Zehnders. Additionally, although AWGs have power advantages, broadband usage of AWGs may be limited as compared to MMI couplers and splitters.

The mechanisms and systems proposed in this disclosure circumvent the problems described above. The present disclosure describes methods and systems for combining MMI symmetric couplers and MMI asymmetric couplers for systems wherein the number of waveguides is outside of $2^n$ configurations, i.e., 2, 4, 8, 16. By using both MMI symmetric couplers and MMI asymmetric couplers in a configuration and by altering power output for the MMI asymmetric couplers, broadband insertion loss per waveguide may also be minimized. Additionally, one or more anti-reflective structures may reduce reflection within MMI asymmetric couplers and symmetric couplers making the couplers suitable for coherent optical systems.

For example, in one example, a MMI symmetric coupler may be positioned on the substrate of a photonic integrated circuit. The MMI symmetric coupler may be configured to split power of an optical signal in a split power ratio within 1 db of 50:50. For example, the MMI symmetric coupler may be configured to split power of an optical signal in a split power ratio within plus or minus 0.5 db of 50:50 An MMI asymmetric coupler may also be positioned on the substrate. The MMI asymmetric coupler may be configured to split power of an optical signal in a split power ratio other than 50:50. The MMI symmetric coupler and the MMI asymmetric coupler may be in a cascaded configuration in that a proximal end of the MMI asymmetric coupler is in optical communication with a distal end of the MMI symmetric coupler.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The system and methods provided in the present disclosure are capable of other embodiments or of being practiced or carried out in various ways. Also, it is to be understood that the phraseology and terminology employed herein is for purposes of description, and should not be regarded as limiting.

The following detailed description refers to the accompanying drawings. The same reference numbers in different drawings may identify the same or similar elements.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements, but may also include other elements not expressly listed or inherent to such process, method, article, or apparatus.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, any reference to "one embodiment," "an embodiment," "some embodiments," "one example," "for example," or "an example" means that a particular element, feature, structure or characteristic described in connection with the embodiment is included in at least one embodiment. The appearance of the phrase "in some embodiments" or "one example" in various places in the specification is not necessarily all referring to the same embodiment, for example.

Referring now to the Figures, and in particular to FIG. 1, shown therein and designated by reference numeral 10 is an exemplary optical combining system. The optical combining system 10 includes two or more optical sources 12 and a combiner 14 positioned on common substrate 16 to form a Photonic Integrated Circuit. Each optical source 12 may be capable of transmitting one or more signals having wavelength λ via one or more waveguides 18. For example, in some embodiments, the optical sources 12 may each include a laser and modulator transmitting one or more signals having wavelength λ via waveguides 18. FIG. 1 illustrates multiple optical sources 12 transmitting signals having wavelength $\lambda_1$-$\lambda_{10}$ via waveguides 18. Although FIG. 1 illustrates ten optical sources 12, it should be known that any number of optical sources 12 may be used in accordance with the present disclosure.

Figure 2:
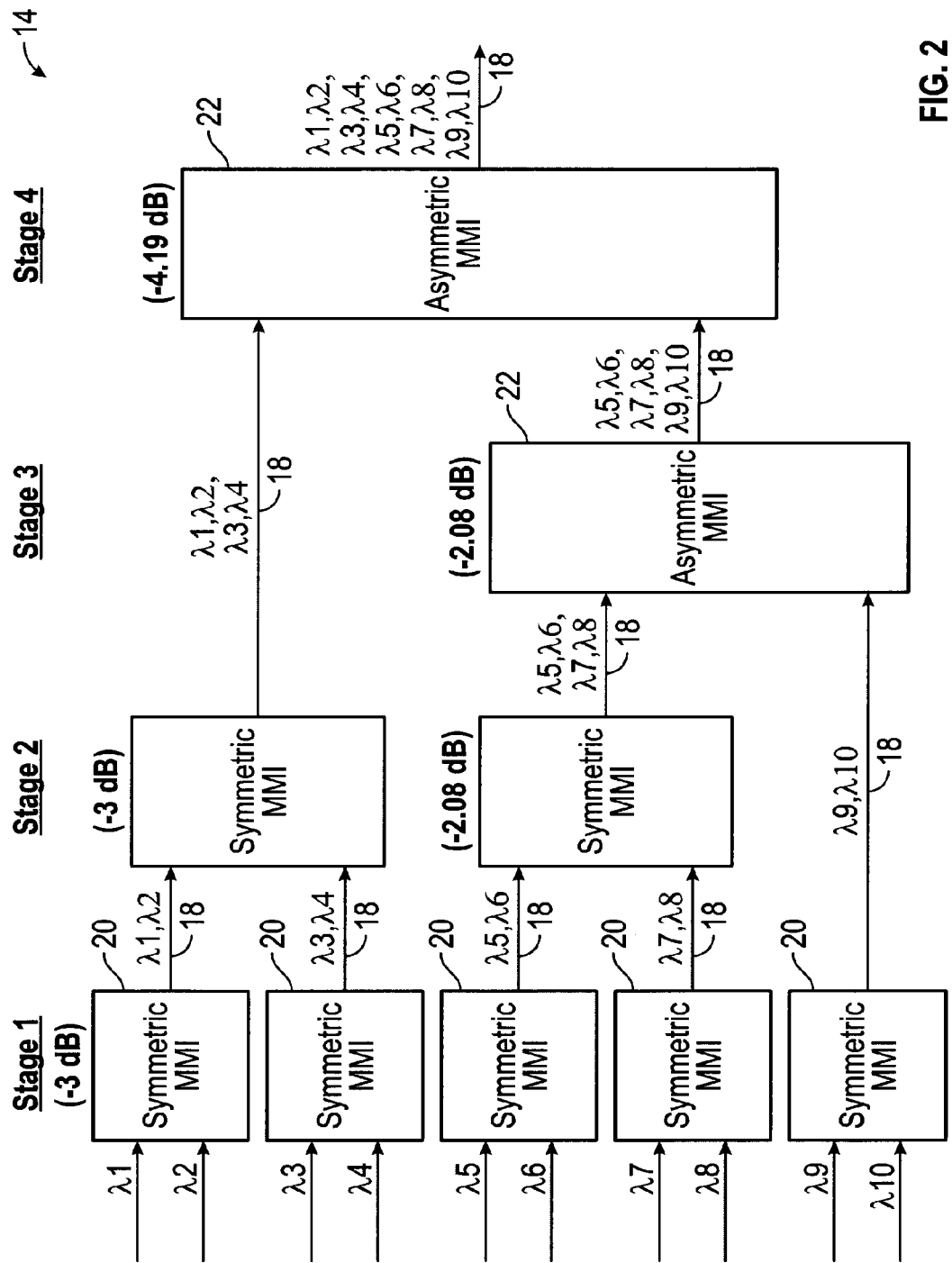
FIG. 2 is a diagrammatic view of an exemplary combiner for use in the optical combining system illustrated in FIG. 1, the combiner having a cascaded configuration for symmetric couplers and asymmetric couplers in accordance with the present disclosure.

FIG. 2 illustrates a more detailed view of the combiner 14. Generally, the combiner 14 may include one or more symmetric couplers 20 and one or more asymmetric couplers 22 capable of combining power from multiple optical sources 12 as illustrated in FIG. 1.

Referring to FIGS. 1 and 2, symmetric couplers 20 may be used to combine power transmitted from two or more waveguides 18 and distribute the combined power in an evenly split power ratio (i.e., within 1 db of 50:50 power split ratio, within 0.5 db of 50:50 power split ratio, or 50:50 power split ratio). Asymmetric couplers 22 may be used to combine power transmitted from two or more waveguides 18 and distribute the combined power such that the power split ratio is not evenly split (i.e., not within 1 dB of a 50:50 power split ratio). For example, in some embodiments, the asymmetric coupler 22 may combine power transmitted from two or more waveguides 18 and distribute the combined power with a power split ratio of 80:20.

In particular, the combination of cascaded symmetric couplers 20 and asymmetric couplers 22 may aid in coupling power (or splitting power as discussed in further detail herein) to a single waveguide 18 from multiple waveguides 18 wherein the number of waveguides 18 inserting power into the combiner 14 is not $2^N$ wherein N is an integer. Even further, broadband insertion loss for each waveguide 18 may be minimized (e.g., within 0.2 dB of the minimum loss per waveguide) for such systems wherein the number of channels is not $2^N$. The insertion loss, when minimized for a particular optical polarization, may suppress output power for orthogonal polarization due to birefringence of the asymmetric couplers 22.

The polarizing function may be further improved by metallizing sections of the asymmetric coupler 22 as described in further detail herein. Other symmetric coupler(s) 20, asymmetric coupler(s) 22 and waveguide(s) 18 described herein may also be metallized, however, the larger width of the asymmetric coupler 22 may aid in the metallization. Additionally, using the processes as described herein, the asymmetric coupler 22 may generally be the final stage, and as such, all optical signals may have exposure to the metallized surface.

FIG. 2 illustrates an exemplary cascaded configuration of the combiner 14 in which the symmetric couplers 20 and asymmetric couplers 22 form a broadband 10:1 waveguide combiner. The combined use of both one or more symmetric couplers 20 and one or more asymmetric couplers 22 as shown in FIG. 2 minimizes insertion loss within 0.2 dB of the minimum loss per waveguide. For example, the symmetric couplers 20 and asymmetric couplers 22 may be cascaded in four stages: Stage 1, Stage 2, Stage 3, and Stage 4. Each stage may include a theoretical minimum loss per stage. For example, using the configuration illustrated, the maximum channel loss may 10.19 dB.

It should be noted that the concepts described herein, including description of symmetric couplers 20 and asymmetric couplers 22 are applicable to more or fewer channels than shown in FIG. 2, and also applicable when the number of channels is $2^N$ or is not $2^N$, wherein N is an integer. Additionally, although MMI couplers are discussed herein, features described may be applicable to MMI couplers including interferometer and/or filter functions.

Figure 3:
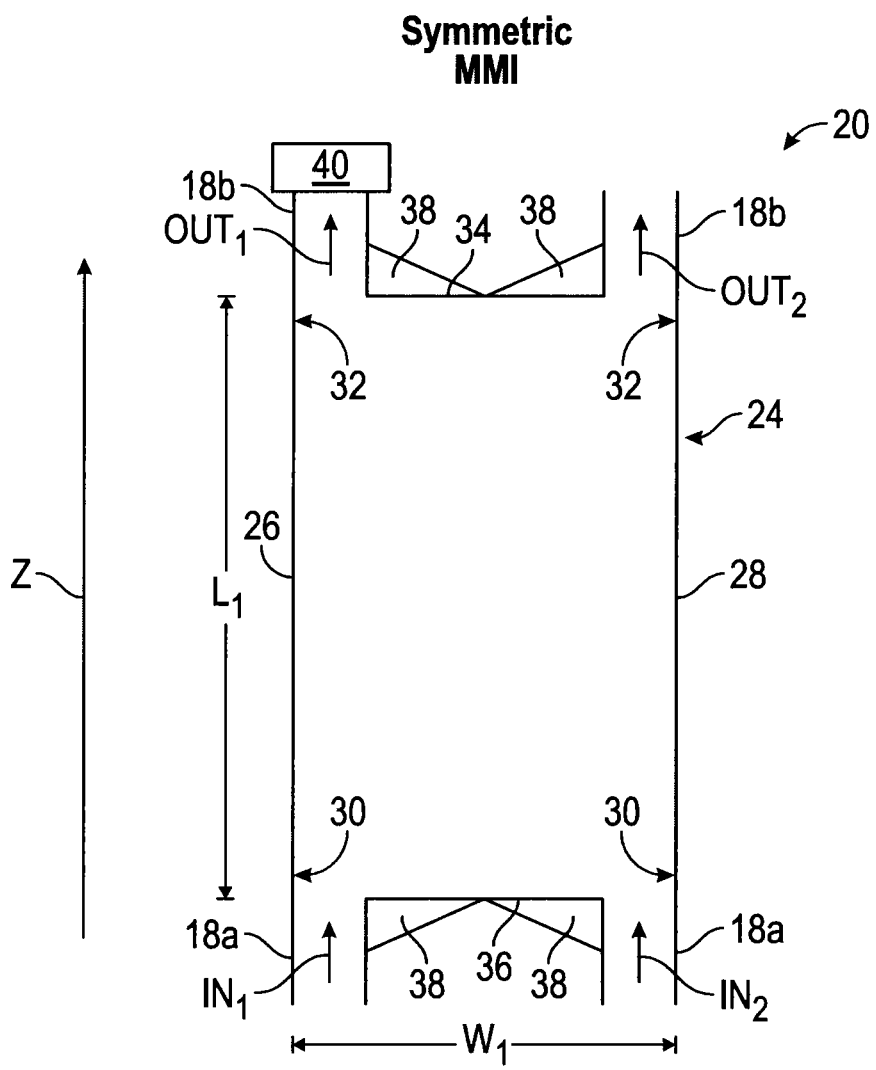
FIG. 3 is a fragmental top plan view of an exemplary symmetric coupler, constructed in accordance with the present disclosure and usable in the combiner depicted in FIG. 2.
Figure 4:
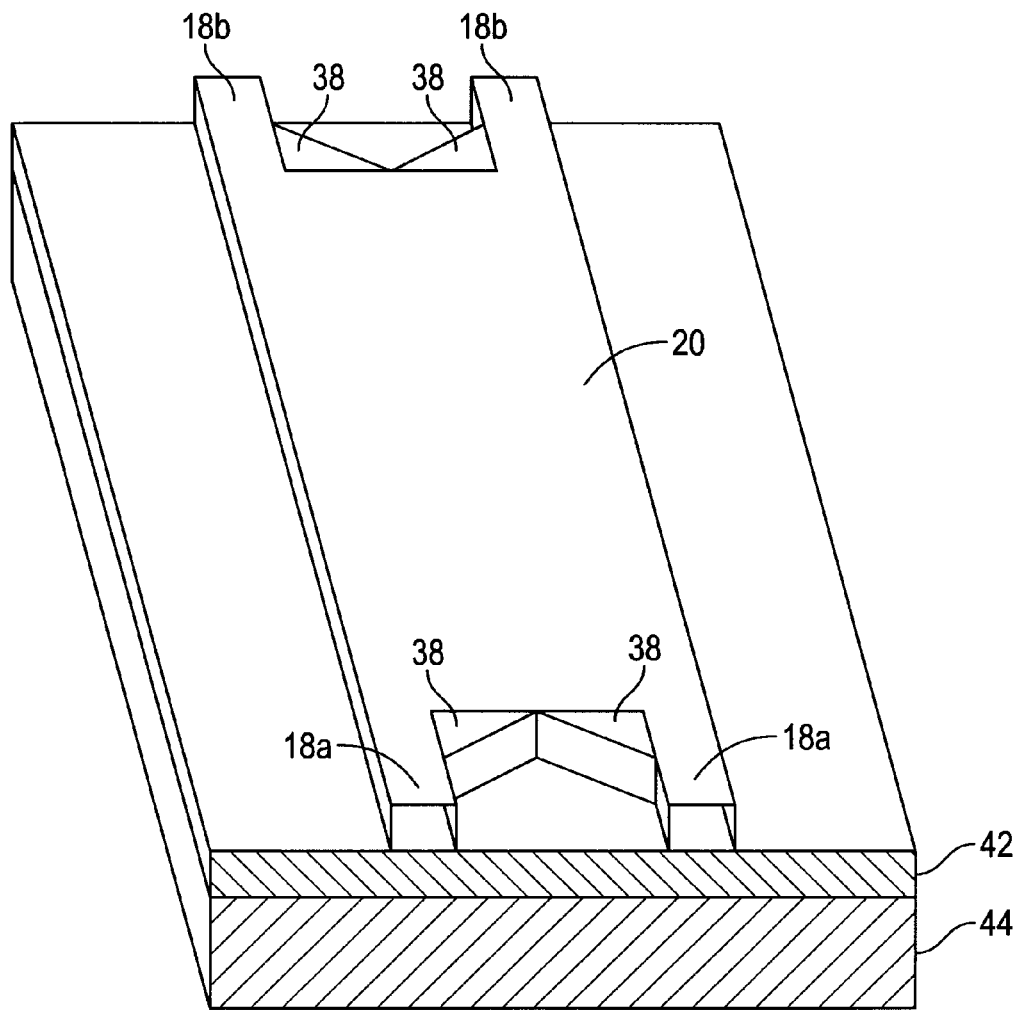
FIG. 4 is a fragmental perspective view of an exemplary intermediate structure constructed in accordance with the present disclosure that may be used to form an integrated optics device having a symmetric coupler.

FIGS. 3 and 4 illustrate exemplary symmetric couplers 20 having a multimode waveguide region 24 connecting one or more input waveguides 18a to one or more output waveguides 18b. Input waveguides 18a may provide first and second input signals $IN_1$ and $IN_2$ to the multimode waveguide region 24. The input waveguides 18a include an input field profile. The input field profile of each waveguide 18a may be reproduced in single or multiple images at periodic intervals along the propagation direction of the multimode waveguide region 24. This is known as the self-imaging principle. Using the self-imaging principle, input signals $IN_1$ and $IN_2$ are reproduced periodically along the propagation axis Z of the multimode waveguide region 24, and provide output signals $OUT_1$ and $OUT_2$ to output waveguides 18b.

Functionality of the symmetric coupler 20 in providing power in a 50:50 split ratio as described herein may be determined by geometry of formation of the multimode waveguide region 24. For example, the output signals $OUT_1$ and $OUT_2$ may each include portions of the input signals $IN_1$ and $IN_2$. The multimode waveguide region 24 of the symmetric coupler 20 has a coupling length $L_1$ and a width $W_1$ selected to provide the output signals $OUT_1$ and $OUT_2$ to the output waveguides 18b at a distinct power ratio. In some embodiments, the width $W_1$ may remain constant along the propagation axis Z for the symmetric coupler 20. Generally, for the multimode waveguide region 24, the coupling length $L_1$ and the width $W_1$ may be selected such that a splitting ratio of the symmetric coupler 20 is approximately 50:50. For example, the coupling length $L_1$ and the width $W_1$ may be selected such that 50% of the power associated with each of the input signals $IN_1$ and $IN_2$ may be present in each of the output signals $OUT_1$ and $OUT_2$ respectively.

Referring to FIG. 3, the multimode waveguide region 24 of the symmetric coupler 20 may be formed by opposing first and second sides 26 and 28. In some embodiments, the opposing first and second sides 26 and 28 may be positioned parallel with each other. Each side 26 and 28 may include first and second end portions 30 and 32, with each end portion 30 and 32 continuous with formation of optical waveguides 18a and 18b as illustrated in FIG. 3.

The symmetric coupler 20 may also include a first transverse side 34 and an opposing second transverse side 36. The first transverse side 34 may extend between the input waveguides 18a and the second transverse side 36 may extend between the output waveguides 18b.

In some embodiments, one or more symmetric couplers 20 may include one or more anti-reflection structures 38 as illustrated in FIGS. 3 and 4. The anti-reflection structures 38 may be formed to reduce reflection of light back into the input waveguides 18a. One or more anti-reflection structures 38 may be positioned and/or formed on or adjacent to transverse side 34 and/or 36 of the multimode waveguide region 24. For example, as illustrated in FIG. 3, polygonal anti-reflection structures 38 are positioned on each transverse side 34 and 36 of the mulitmode waveguide region 24. Anti-reflection structures 38 may be formed in any shape capable of reducing reflection of light back into the input waveguides 18a. In some embodiments, one or more anti-reflection structures 38 may be formed of the same materials of the symmetric coupler 20.

In some embodiments, optical power may be monitored via an optical power monitor port 40 in the symmetric coupler 20. For example, the optical power monitor port 40 may tap the symmetric coupler 20 at one or more output waveguides 18b. The optical power monitor port 40 may provide capabilities (e.g., via providing communication to a photodiode) to monitor power with little or no expense to combiner performance.

Symmetric couplers 20 may be formed using any standard or later developed techniques used in the industry to pattern optical components including, but not limited to, dry etching, wet-etching, flame hydrolysis deposition, chemical vapor deposition, reactive ion etching, physically enhanced CVD, imprint lithography, combined nanoimprint and photolithography, immersion lithography, extreme ultraviolet lithography, electron beam lithography, focused ion beam lithography, and the like. FIG. 4 illustrates the symmetric coupler 20 formed on a cladding layer 42 and a substrate 44 as is known in the art.

Figure 5:
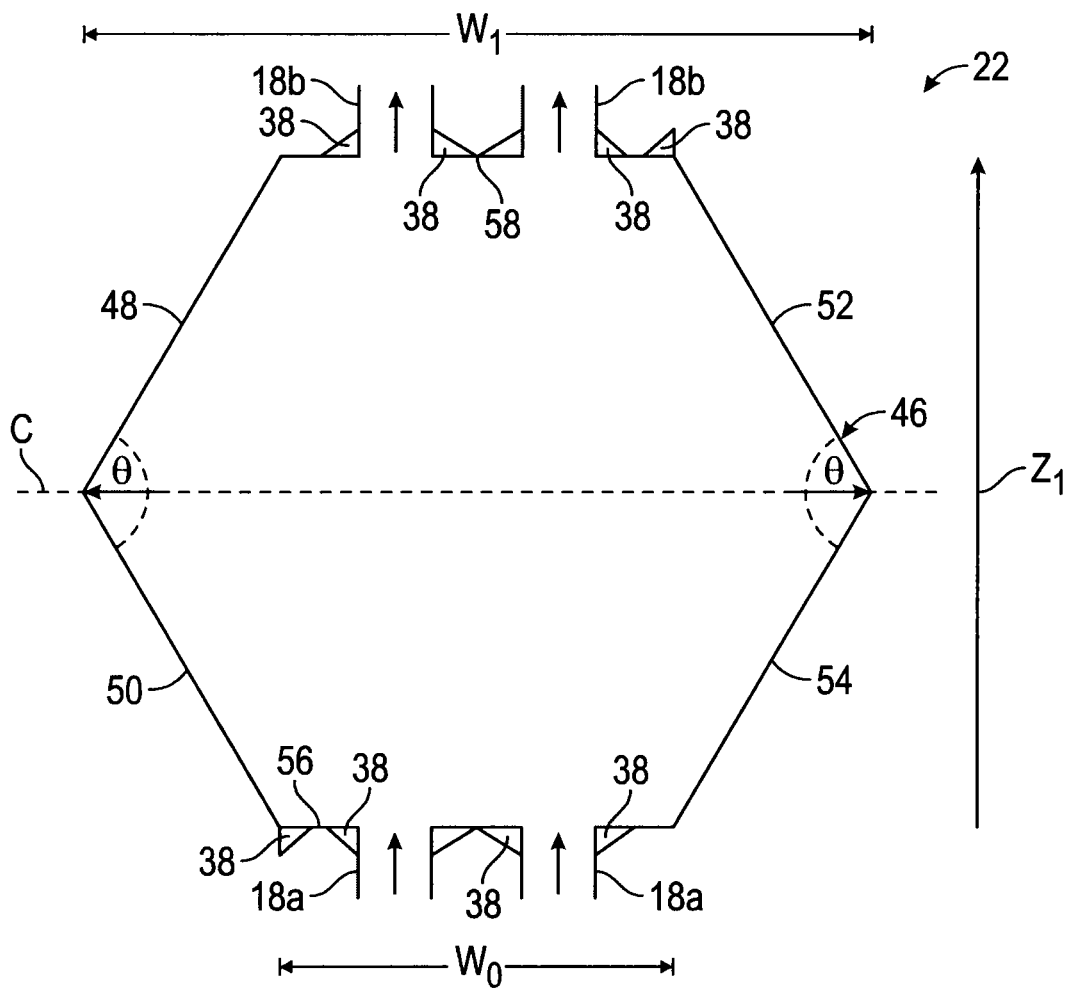
FIG. 5 is a fragmental top plan view of an exemplary asymmetric coupler, constructed in accordance with the present disclosure and usable in the combiner depicted in FIG. 2.

FIG. 5 illustrates an exemplary asymmetric coupler 22 having a multimode waveguide region 46 connecting one or more input waveguides 18a and one or more output waveguides 18b. The multimode waveguide region 46 of the asymmetric coupler 22 may have varying width W across the propagation axis $Z_1$ as described in further detail herein.

Referring to FIG. 5, the multimode waveguide region 46 of the asymmetric coupler 22 includes first and second sides 48 and 50, respectively, connected at an obtuse angle Θ. Opposing first and second sides 52 and 54 may be connected at approximately the same obtuse angle Θ and positioned such that width $W_1$ at a centerline C shown as being perpendicular to the propagation axis $Z_1$ is maximized. Alternatively, the width $W_1$ may be smaller than the width $W_0$ at the centerline C drawn perpendicular to the propagation axis $Z_1$. Within the art, this asymmetric coupler design is commonly referred to as a "butterfly" coupler and may be used as an exemplary embodiment of the asymmetric coupler 22 in accordance with the present disclosure.

The asymmetric coupler 22 may also include a first transverse side 56 and an opposing second transverse side 58. The first transverse side 56 may extend and connect the sides 50 and 54. The first transverse side 56 may also provide access to the input waveguides 18a. Similarly, the second transverse side 58 may extend and connect the sides 48 and 52 and also provide access to the output waveguides 18b.

Input waveguides 18a may provide first and second input signals $IN_1$ and $IN_2$ to the multimode waveguide region 46. Using the self-imaging principle, input signals $IN_1$ and $IN_2$ are reproduced periodically along the propagation axis $Z_1$ of the multimode waveguide region 46, and output signals $OUT_1$ and $OUT_2$ may be provided to output waveguides 18b.

Functionality of the asymmetric coupler 22 in providing a tunable power splitting ratio may be determined by geometry of formation of the multimode waveguide region 46. Similar to the symmetric coupler 20 of FIGS. 3 and 4, the output signals $OUT_1$ and $OUT_2$ of the asymmetric coupler 22 may each include portions of the input signals $IN_1$ and $IN_2$. The multimode waveguide region 46 of the asymmetric coupler 22 has a coupling length $L_1$ and varying width W selected to provide the output signals $OUT_1$ and $OUT_2$ to the output waveguides 18b at a distinct power ratio. For example, for the multimode waveguide region 24, the coupling length $L_1$ and the varying width W may be selected such 62% of the power associated with each of the input signals $IN_1$ and $IN_2$ may be present in one output signal $OUT_1$, and 38% of the power may be present in another output signal $OUT_2$. Determinations of power percentages may be based on desired configuration of the optical component as described herein (e.g., cascaded levels of symmetric and asymmetric couplers).

In some embodiments, one or more asymmetric couplers 38 may include one or more anti-reflection structures 38 as illustrated in FIG. 5. The anti-reflection structures 38 may be formed to reduce reflection of light back into the input waveguides 18a. One or more anti-reflection structures 38 may be positioned and/or formed on or adjacent to transverse side 56 and/or 58 of the multimode waveguide region 46. For example, as illustrated in FIG. 5, polygonal anti-reflection structures 38 are positioned on each transverse side 56 and 58 of the multimode waveguide region 46. Anti-reflection structures 38 may be formed in any shape capable of reducing reflection of light back into the input waveguides 18a. In some embodiments, one or more anti-reflection structures 38 may be formed of the same materials of the asymmetric coupler 22.

Similar to the symmetric couple 20 illustrated in FIG. 3, one or more optical power monitors 40 may be integrated and/or in communication with the asymmetric coupler 22. For example, the optical power monitor 40 may tap the asymmetric coupler 22 at one or more output waveguides 18b. The optical power monitor 40 may monitor power with little or no expense to combiner performance.

Figure 6:
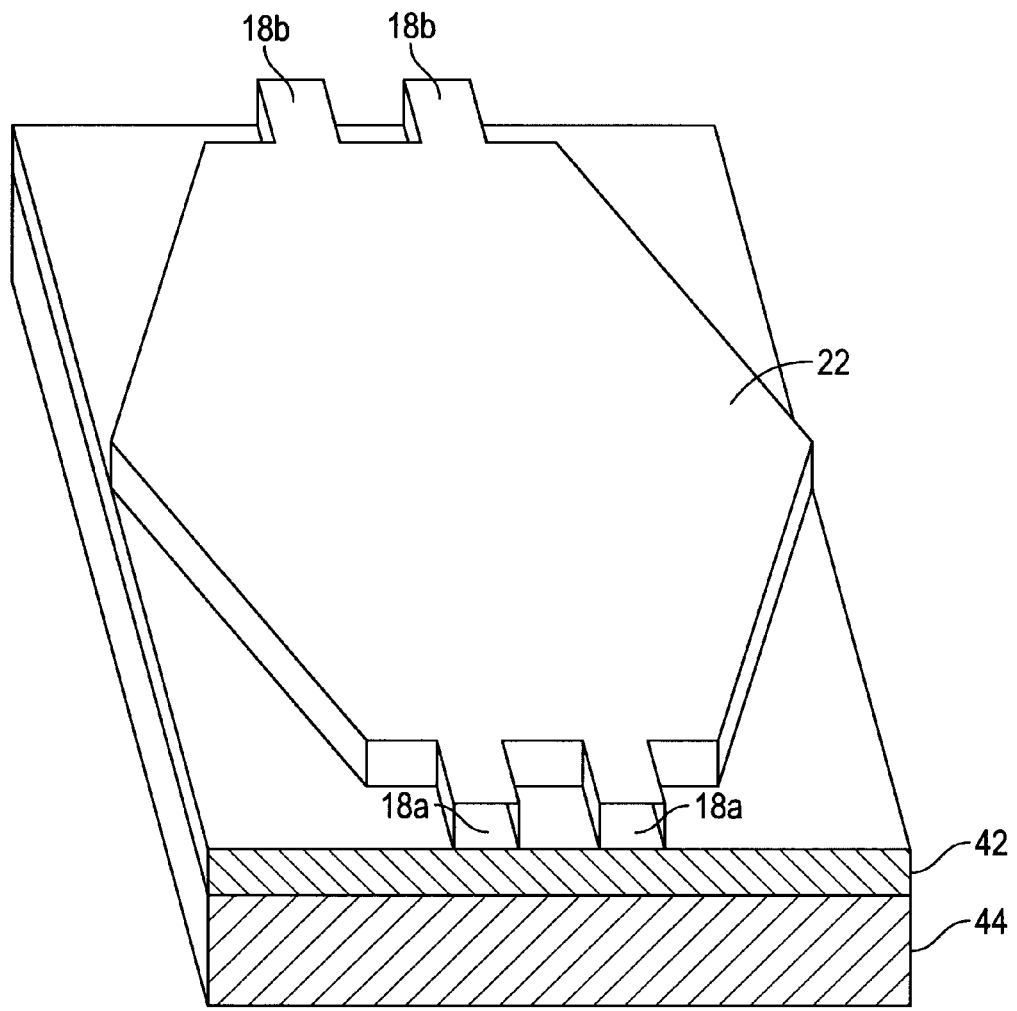
FIG. 6 is a fragmental perspective view of an exemplary intermediate structure constructed in accordance with the present disclosure that may be used to form an integrated optics device having an asymmetric coupler.

Asymmetric couplers 22 may be formed using any standard or later developed techniques used in the industry to pattern optical components including, but not limited to, dry etching, wet-etching, flame hydrolysis deposition, chemical vapor deposition, reactive ion etching, physically enhanced CVD, imprint lithography, combined nanoimprint and photolithography, immersion lithography, extreme ultraviolet lithography, electron beam lithography, focused ion beam lithography, and the like. FIG. 6 illustrates the asymmetric coupler 22 formed on a cladding layer 42 and a substrate 44 as is known in the art.

Figure 7:
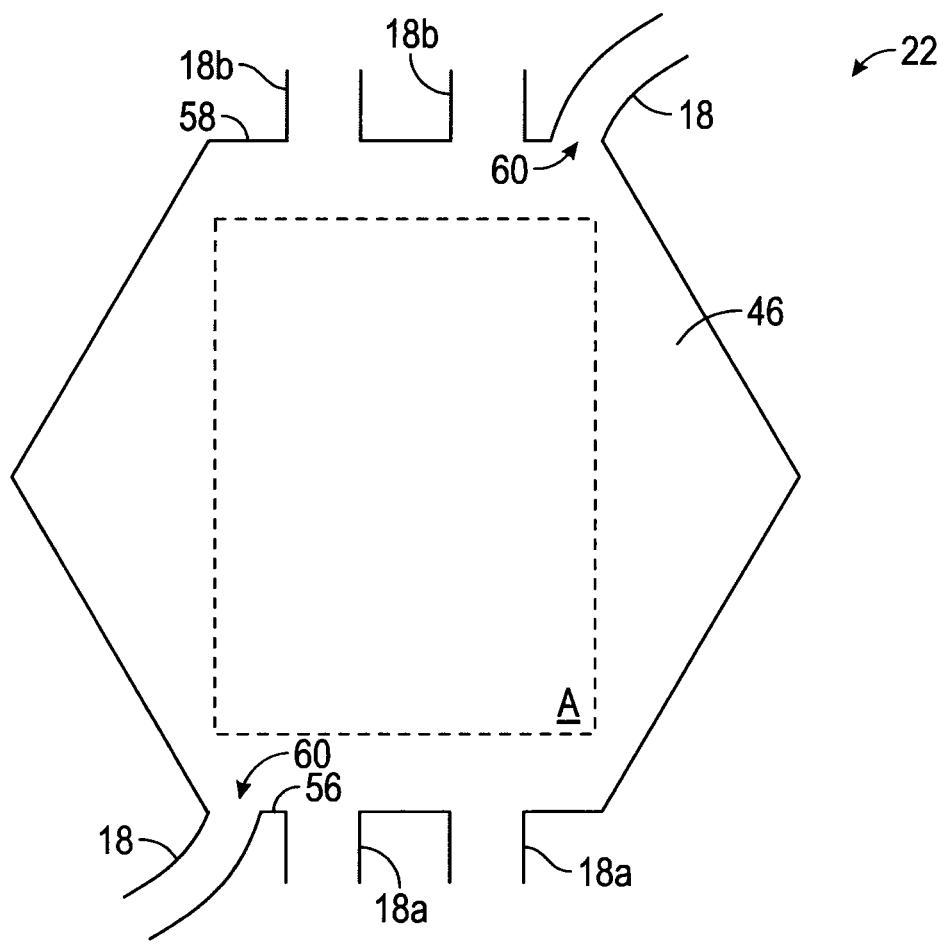
FIG. 7 is a fragmental top plan view of an exemplary asymmetric coupler, constructed in accordance with the present disclosure and usable in the combiner depicted in FIG. 2.

Referring to FIG. 7, in some embodiments, the asymmetric coupler 22 may include one or more ports 60. For example, transverse side 56 and/or transverse side 58 may include one or more ports 60. Ports 60 may provide access to one or more waveguides to inject or tap energy. For example, one or more ports 60 may be used to monitor power. Additionally, one or more ports 60 may be used to inject additional light into the multimode waveguide region 46.

In some embodiments, the asymmetric coupler 22 may include a metalized region A as shown by the dashed line box in FIG. 7. Metallization of at least a portion of the multimode waveguide region 46 may be provided to aid in polarization extinction. For example, metallization of at least a portion of the multimode waveguide region 46 may be provided such that transverse magnetic light may be absorbed. Materials used for metallization of the portion of the multimode waveguide region 46 may include, but are not limited to, gold, titanium, nickel, silver, and/or the like. For example, the portion may be formed of gold with a thin layer of titanium to improve adhesion.

Shape and formation of the metalized region A may be dependent on desired absorption of transverse magnetic light. Generally, shape and formation may be determined such that interaction of an optical signal with the metalized region A may be maximized to improve absorption of transverse magnetic (TM) polarized light while minimizing absorption of transverse electric (TE) polarized light. For example, in some embodiments, the metalized region A may be substantially similar in shape and size to the multimode waveguide region 46. In this example, metallization of the sides of the asymmetric coupler 22 may be avoided to minimize absorption of TE polarized light.

Figure 8:
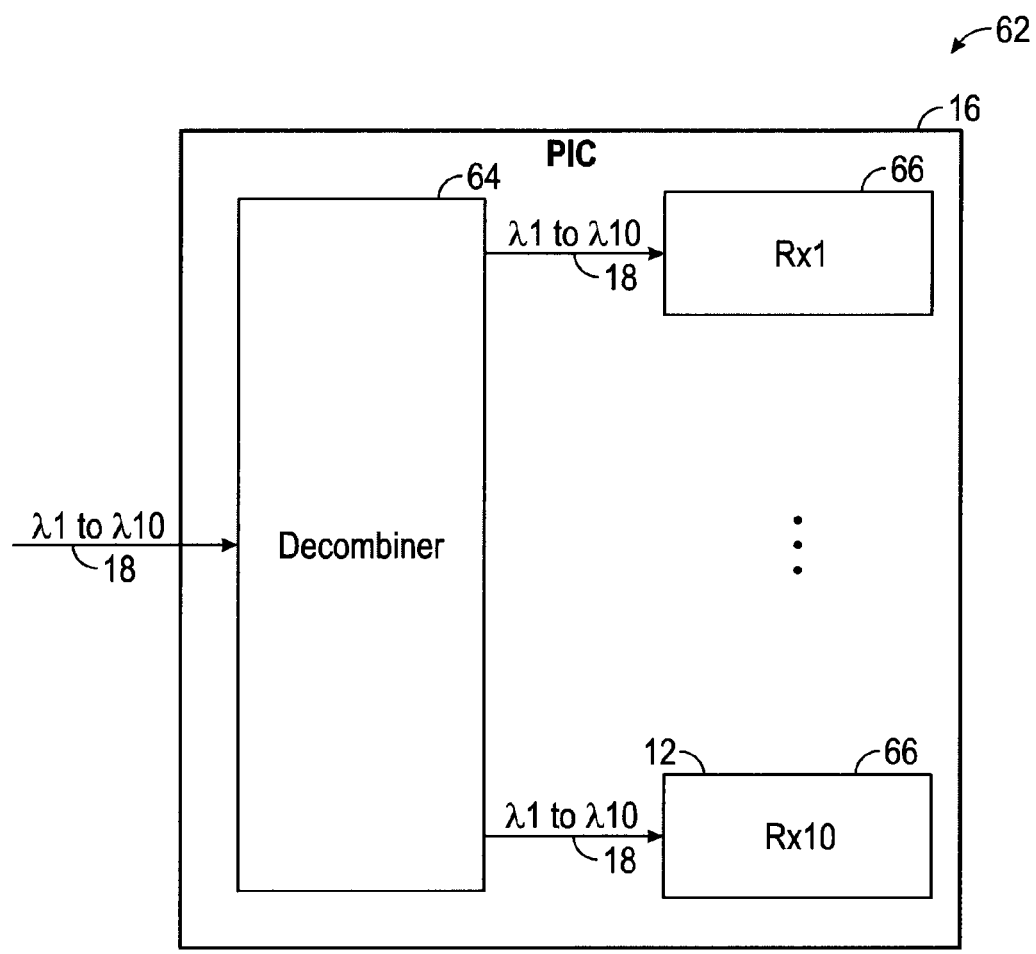
FIG. 8 is a diagrammatic view of an exemplary optical decombining system having a decombiner in accordance with the present disclosure.
Figure 9:
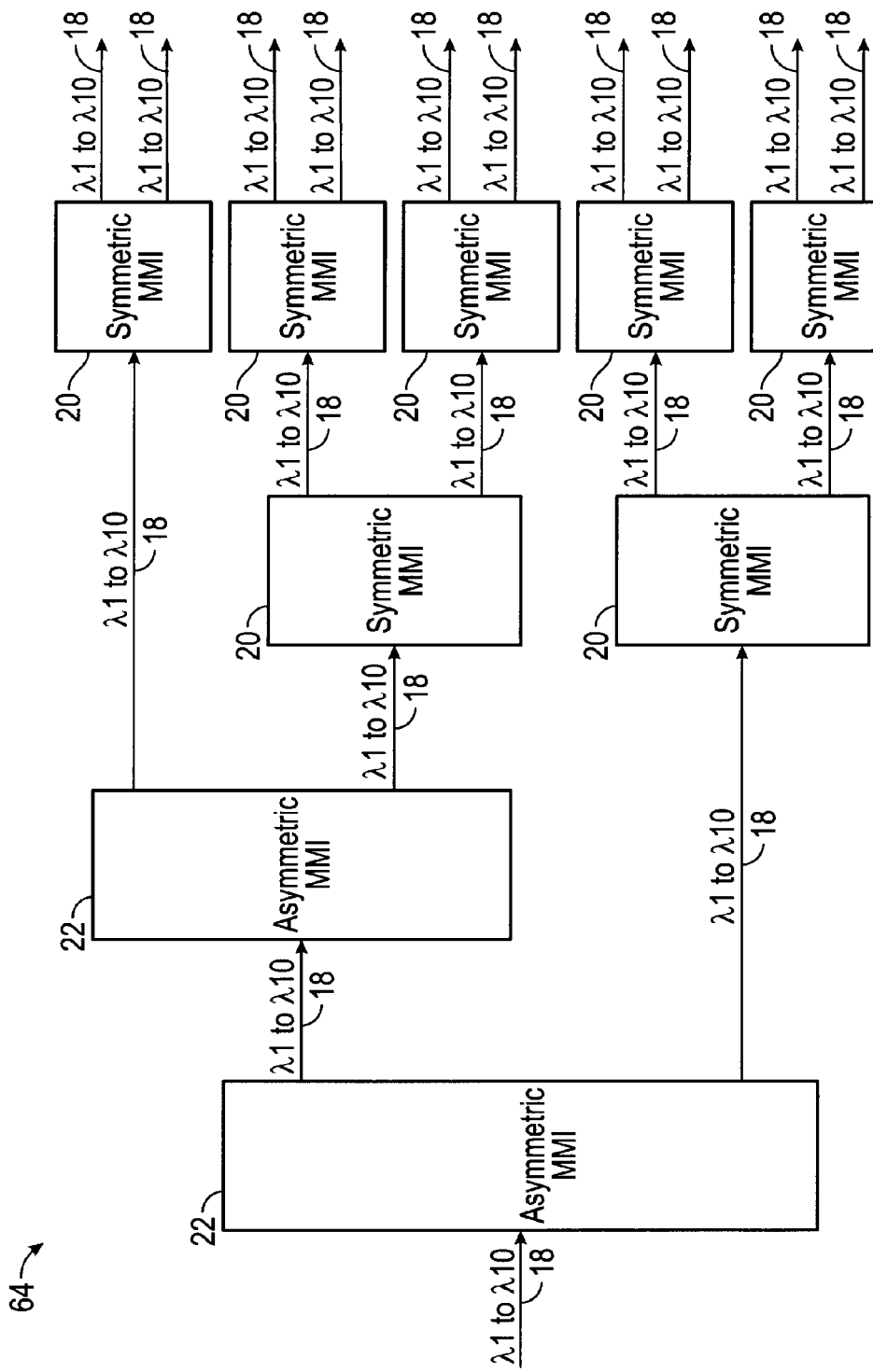
FIG. 9 is a diagrammatic view of an exemplary decombiner for use in the optical decombining system illustrated in FIG. 8, the decombiner having a cascaded configuration for symmetric couplers and asymmetric couplers in accordance with the present disclosure.

Referring to FIGS. 8 and 9, shown therein and designated by reference numeral 62 is an exemplary optical decombining system. The optical decombining system 62 may include one or more decombiners 64 positioned on a substrate 16 to form a Photonic Integrated Circuit. The decombiner 64 may be capable of receiving at least one signal having multiple wavelengths λ via at least one waveguide 18 and providing signal outputs of different wavelengths. Although FIG. 8 illustrates signal outputs of wavelengths $\lambda_{1-10}$, it should be understood that any number of signal outputs may be provided by the optical decombining system 62. In some embodiments, the signal outputs may be further provided to one or more optical system receivers 66, i.e., "$R_X$" positioned on the substrate 16 of the Photonic Integrated Circuit, for example. Further, power of each signal output may be substantially similar at each receiver 66.

FIG. 9 illustrates a more detailed view of the decombiner 64 of the optical decombining system 62. Generally, the decombiner 64 may include one or more symmetric couplers 20 cascaded with one or more asymmetric couplers 22 and capable of decombining power from one or more optical signals as illustrated in FIG. 9. The symmetric couplers 20 and the asymmetric couplers 22 may be similar in formation and geometry relative to the symmetric couplers 20 and asymmetric couplers 22 described in relation to FIGS. 2-7.

The symmetric couplers 20 may be used to decombine power in an evenly split power ratio (i.e., within 1 db of 50:50 power split ratio, within 0.5 db of 50:50 power split ratio, or 50:50 power split ratio). Asymmetric couplers 22 may be used to decombine power such that the power split ratio is not evenly split (i.e., not a 50:50 power split ratio). For example, in some embodiments, the asymmetric coupler 22 may decombine power and distribute the decombined power with a power split ratio of 80:20.

The combination of cascaded symmetric couplers 20 and asymmetric couplers 22 may aid in splitting power from one or more optical signals across any number of waveguides 18, including $2^N$ waveguides 18 (wherein N is an integer). Similar to the combiner 14 illustrated in FIG. 2, broadband insertion loss for each waveguide 18 may be minimized for the decombiner 64.

Figure 10:
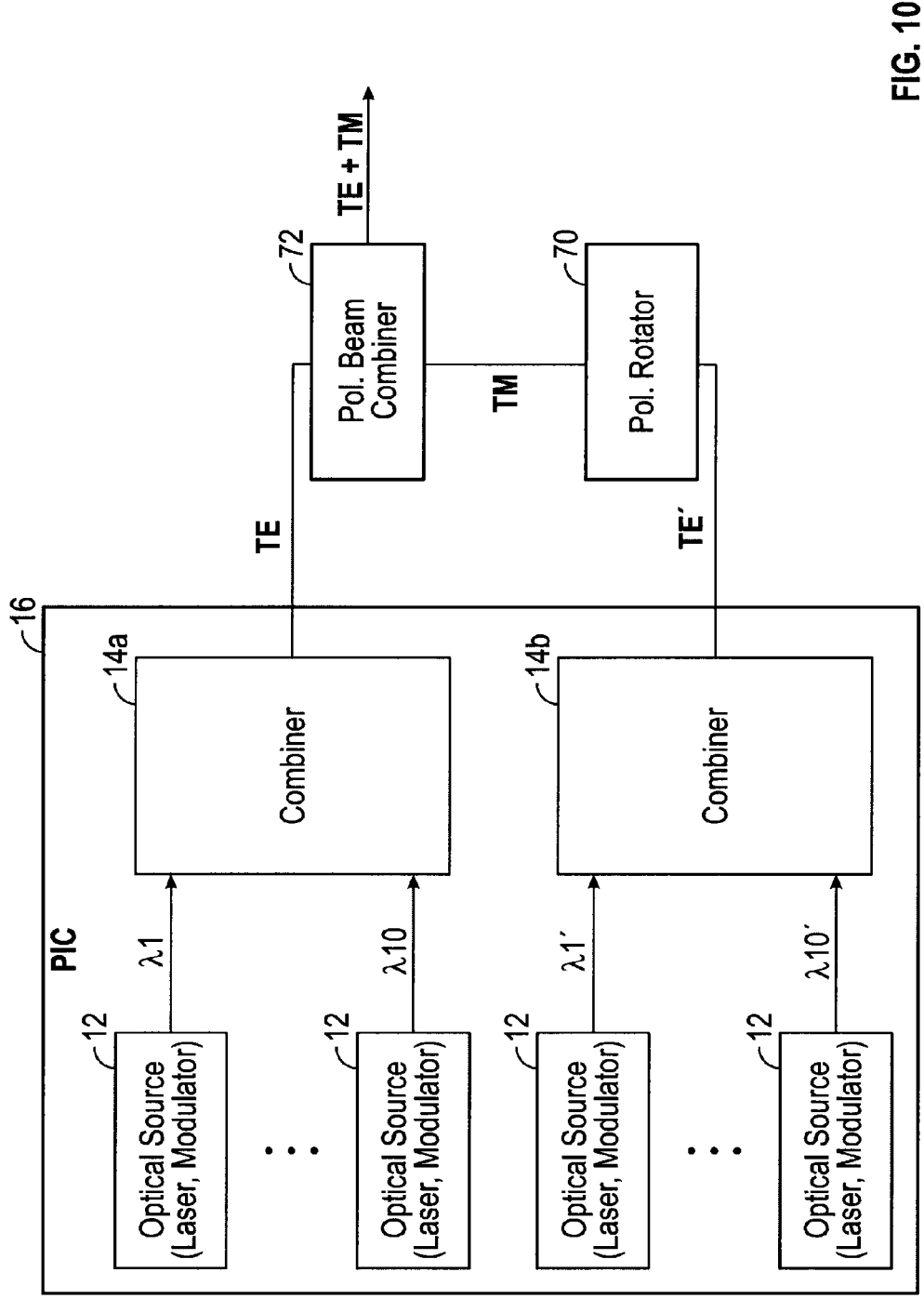
FIG. 10 is a diagrammatic view of another exemplary optical combining system having multiple combiners in accordance with the present disclosure.

Referring to FIG. 10, as described herein, combiners 14 may be used to further improve absorption of transverse magnetic (TM) polarized light while minimizing absorption of transverse electric (TE) polarized light. Using such techniques, noise caused by the inadvertent creation of transverse magnetic polarized light may be reduced or essentially eliminated. Generally, combiners within the art provide both TE light and TM light, and as such, rotating the polarization of light supplied by one of the combiner and combining the rotated light with the output of the other combiner may result in the combined signal having significant noise. The combiners 14, as described in detail herein, however may maintain the original TE polarization such that when resulting optical signals from the combiners 14a and 14b are further combined, the combined signal includes essentially no noise.

As illustrated in FIG. 10, one or more optical sources 12 may provide TE polarized light in two or more wavelengths λ to combiners 14a and 14b. Optical signals provided by the combiners 14a and 14b may include TE polarized light and TE' polarized light respectively with each having essentially no TM polarized light. Using a polarization rotator 70, the optical signal having TE' polarized light may be converted to TM polarized light. Using a polarization beam combiner 72, the TE polarized light and the TM polarized light may be further combined to polarization multiplex the outputs of the combiners 14a and 14b.

Figure 11:
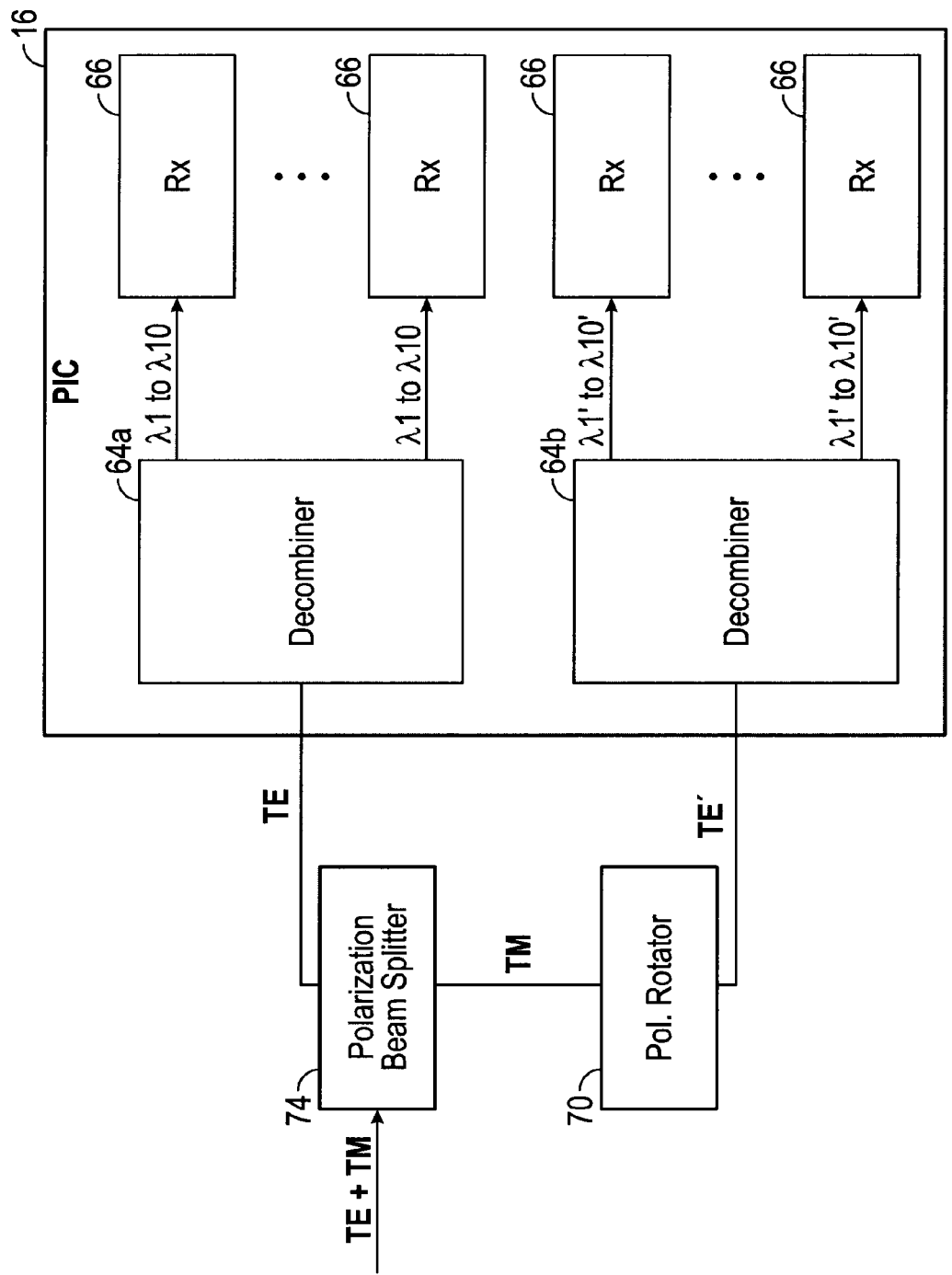
FIG. 11 is a diagrammatic view of another exemplary optical decombining system having multiple decombiners in accordance with the present disclosure.

As shown in FIG. 11, similarly, noise may be reduced or essentially eliminated using multiple decombiners 64. The combined TE and TM polarized light may be split using a polarization beam splitter 74 providing TE polarized light and TM polarized light. Using the polarization rotator 70, the optical signal having TM polarized light may be converted to TE' polarized light. The TE polarized light and the TE' polarized light may be provided to the decombiners 64a and 64b to provide multiple optical signals having wavelengths $\lambda_{1-x}$ to the optical system receivers 66.

Figure 12:
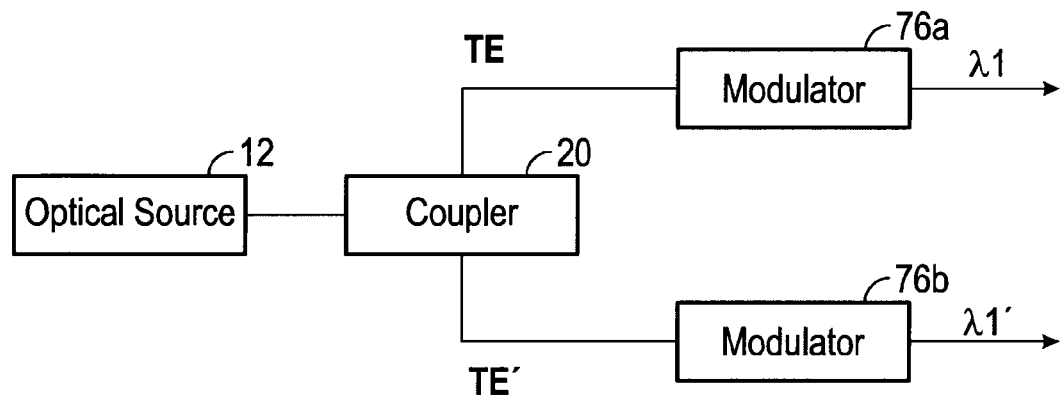
FIG. 12 is a diagrammatic view of an exemplary coupler configured to split optical signals from an optical source in accordance with the present disclosure.

In some embodiments, a single optical source 12 may be used to generate the light for each wavelength on the substrate 16 of the Photonic Integrated Circuit. For example, as illustrated in FIG. 12, a single optical source 12 may provide an optical signal to the symmetric coupler 20. The symmetric coupler 20 may split the optical signal into two different signals with each optical signal having about 50 percent power of the original signal as described in further detail herein. Each optical signal may include TE polarized light. Further, each signal may be provided to a first modulator 76a and a second modulator 76b. It should be noted that the optical source 12 may alternatively provide the optical signal to one or more asymmetric couplers 22, with the asymmetric coupler 22 splitting the optical signal into two different signals as described in further detail herein.

Figure 13:
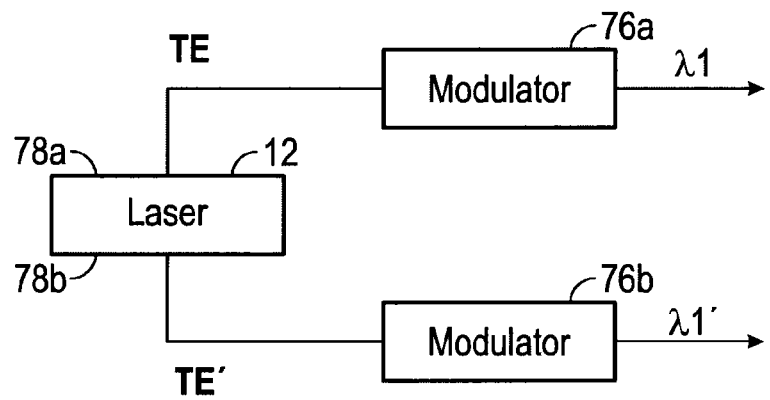
FIG. 13 is a diagrammatic view of an exemplary optical source configured to transmit optical signals in accordance with the present disclosure.

In some embodiments, as illustrated in FIG. 13, the optical signal may be provided and split or divided directly from the optical source 12. The optical source 12 may be a laser. Generally, the laser may include a first facet 78a and a second facet 78b on opposite sides of a quantum well. Optical signals from the first facet 78a having TE polarized light are transmitted from the first facet 78a to the first modulator 76a and optical signals from the second facet 78b having TE polarized light are transmitted from the second facet 78b to the second modulator 76b.

From the above description, it is clear that the inventive concept(s) disclosed herein are well adapted to carry out the objects and to attain the advantages mentioned herein, as well as those inherent in the inventive concept(s) disclosed herein. While the embodiments of the inventive concept(s) disclosed herein have been described for purposes of this disclosure, it will be understood that numerous changes may be made and readily suggested to those skilled in the art which are accomplished within the scope and spirit of the inventive concept(s) disclosed herein.

What is claimed is:

1. An apparatus, comprising:
a first waveguide, a second waveguide, a third waveguide, a fourth waveguide, and a firth waveguide;
a symmetric coupler configured to split power of an optical signal transmitted therethrough in a split power ratio within 1 db of 50:50, the symmetric coupler having a proximal end and a distal end, the proximal end of the symmetric coupler coupled to and in optical communication with the first waveguide and the second waveguide, the distal end of the symmetric coupler coupled to and in optical communication with the fourth waveguide; and,
an asymmetric coupler configured to split power of an optical signal transmitted therethrough in a split power ratio other than 50:50, the asymmetric coupler having a proximal end and a distal end, the asymmetric coupler in cascaded configuration with the symmetric coupler, the cascaded configuration having the proximal end of the asymmetric coupler coupled to and in optical communication with the fourth waveguide and the third waveguide, the distal end of the asymmetric coupler coupled to and in optical communication with the fifth waveguide.

2. The apparatus of claim 1, wherein the symmetric coupler has a coupling length and a splitting ratio, the coupling length configured to combine and direct a first incoming signal at the first waveguide and a second incoming signal at the second waveguide to the fourth waveguide.

3. The apparatus of claim 2, wherein the first incoming signal and the second incoming signal each have a power, and the split power ratio is configured to contribute the power of the first incoming signal and the second incoming signal to approximately one half of a total power of a first output signal directed to the fourth waveguide.

4. The apparatus of claim 3, wherein the asymmetric coupler has a coupling length and a variable width, the coupling length and variable width configured to combine and direct the first output signal to the fifth waveguide and a third incoming signal to the fifth waveguide to form a second output signal.

5. The apparatus of claim 4, wherein the second output signal has a power, and wherein the variable width and the splitting ratio is such that the first output signal contributes a larger amount to the power of the second output signal than the third incoming signal.

6. The apparatus of claim 1, wherein the first waveguide has a first broadband insertion loss less than 0.2 dB, the second waveguide has a second broadband insertion loss less than 0.2 dB, the third waveguide has a third broadband insertion loss less than 0.2 dB, the fourth waveguide has a fourth broadband insertion loss less than 0.2 dB, and the firth waveguide has a fifth broadband insertion loss less than 0.2 dB.

7. The apparatus of claim 1, wherein at least one anti-reflective structure is positioned on the distal end of the asymmetric coupler.

8. The apparatus of claim 1, wherein a multimode waveguide region is positioned between the distal end and the proximal end of the asymmetric coupler, the multimode waveguide region having a metalized portion.

9. The apparatus of claim 1, wherein the distal end of the asymmetric coupler includes a tap light port.

10. The apparatus of claim 1, wherein the symmetric couplers and the asymmetric coupler are configured to maintain a TE polarization of the optical signal.

11. An apparatus, comprising:
an energy source transmitting a first incoming signal, a second incoming signal and a third incoming signal;
a photonic integrated circuit having a substrate:
a first input waveguide, a second input waveguide, and a third input waveguide positioned on the substrate of the photonic integrated circuit to receive the first incoming signal, the second incoming signal and the third incoming signal;
a symmetric coupler positioned on the substrate and coupled to the first input waveguide, the second input waveguide, and a first output waveguide, wherein the symmetric coupler has a coupling length and a splitting ratio such that the first incoming signal and the second incoming signal combine and each provides within 1 db of one-half of a total power of a first output signal directed to the first output waveguide; and, an asymmetric coupler positioned on the substrate and coupled to the third input waveguide, the first output waveguide, and a second output waveguide, wherein the asymmetric coupler has a coupling length and a splitting ratio such that the first output signal and the third incoming signal combine to form a second output signal having a power in which the first output signal contributes a greater amount to the power of the second output signal than the third incoming signal.

12. The apparatus of claim 11, wherein the first input waveguide has a first broadband insertion loss less than 0.2 dB, the second input waveguide has a second broadband insertion loss less than 0.2 dB, the third input waveguide has a third broadband insertion loss less than 0.2 dB, the first output waveguide has a fourth broadband insertion loss less than 0.2 dB, and the second output waveguide has a fifth broadband insertion loss less than 0.2 dB.

13. The apparatus of claim 11, wherein at least one anti-reflective structure is positioned on a surface of the asymmetric coupler.

14. The apparatus of claim 11, wherein a multimode waveguide region is positioned between a distal end and a proximal end of the asymmetric coupler, the multimode waveguide region having a metalized portion.

15. The apparatus of claim 11, wherein the asymmetric coupler includes a distal end and a proximal end, the distal end having a tap light port adjacent to the second output waveguide.

16. The apparatus of claim 11, wherein the symmetric coupler and the asymmetric coupler maintain TE polarization.

17. The apparatus of claim 11, wherein the asymmetric coupler includes a distal end and a proximal end, the distal end of the asymmetric coupler having an injection port positioned adjacent to the second output waveguide.

18. The apparatus of claim 11, wherein the symmetric couple includes a distal end and a proximal end, the distal end having an anti-reflective structure positioned thereon.

19. A method, comprising the steps of:
determining a coupling length and a splitting ratio for a symmetric coupler such that each of a first incoming signal and a second incoming signal transmitted through the symmetric coupler provide within 1 db of one-half power to a first output signal;
determining a coupling length and a splitting ratio for an asymmetric coupler such that the first output signal and a third incoming signal are combined to form a second output signal having a power such that the first output signal contributes a greater amount to the power of the second output signal than the third incoming signal;
determining a cascade pattern for the symmetric coupler and the asymmetric coupler, the cascade pattern having the first output signal from the symmetric coupler provided as an input to the asymmetric coupler; and,
forming an optical device having the cascade pattern.

20. The method of claim 19, wherein the cascade pattern is determined such that the optical device maintains a TE polarization with respect to light passing through the symmetric coupler and the asymmetric coupler.

* * * * *